United States Patent Office 3,157,054
Patented Nov. 17, 1964

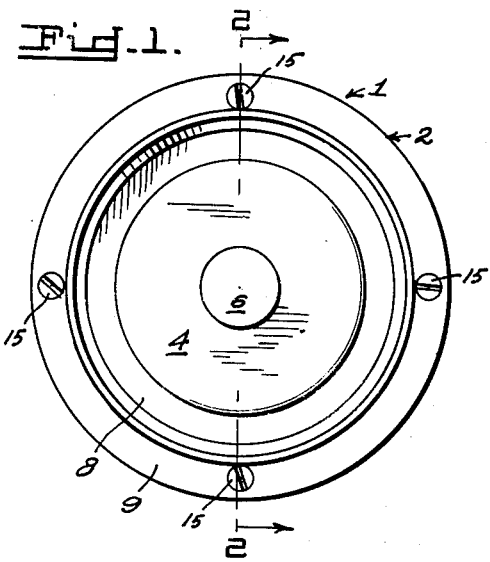
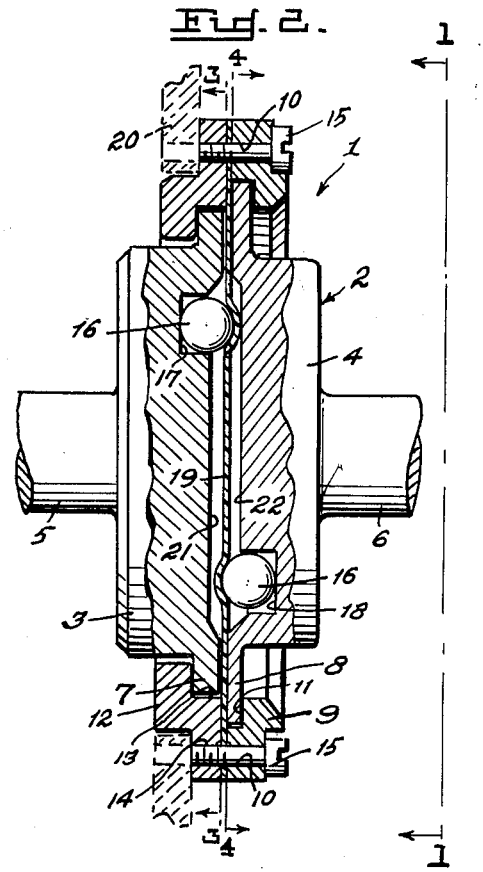
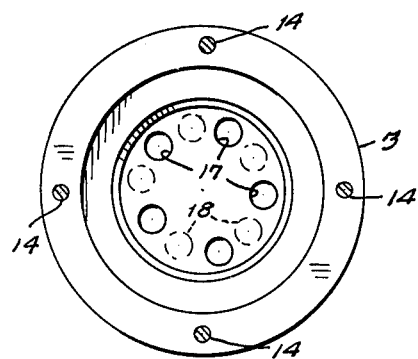
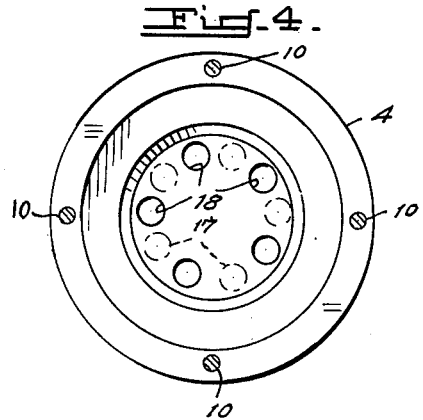
INVENTOR.
Vincent C. Dean

3,157,054
ROTARY FRICTION SHAFT COUPLING
Vincent C. Dean, Ville St. Laurent, Quebec, Canada, assignor, by mesne assignments, to the United States of America as represented by the Secretary of the Army
Filed Oct. 17, 1962, Ser. No. 231,310
2 Claims. (Cl. 74—17.8)

This invention relates to a ball-diaphragm coupling and more particularly to a mechanism to transmit motion through the wall of an enclosure while maintaining a hermetic seal therein and is of a particular usefulness in winding, setting, arming and other similar operations involving relatively low torque and angular velocity.

Such operations have been accomplished heretofore by means of a rod which was sealed in a bellows and was bent in the form of a crank at one end so that rotation of the straight end of the rod caused the crank shaped end to rotate in a circle. This device was bulky and was restricted in its amount of rotation, and the bellows was inefficient since it could not twist indefinitely and particularly could not be rotated continuously.

The present invention is designed to overcome the aforesaid disadvantages by providing a compact, yet reliable crank mechanism consisting essentially of a housing, a driving plate, two sets of balls, a membrane and a driven plate. These components are arranged in a manner similar to a clutch in that the balls, which are partially recessed in the driving plate, dovetail or nest between the balls partially recessed in the driven plate. Rotation is transmitted by virtue of the inability of the driving set of balls to roll over the driven set, therefore the driven set must move in advance of the driving set and thus impart rotation to the driven plate.

Prior to assembly in the housing, the membrane, being of resilient material, is sandwiched between the driven members and the driving members and does not materially interfere with the transfer of motion, while also acting as a seal.

It is an object of this invention to transmit motion through a wall while at the same time maintaining a hermetic seal therewith.

Another object is to provide a mechanism which will take up very little space and which is capable of transmitting a continuous rotation from the outside to the inside of a wall at moderate speed in either direction.

A still further object is to provide a driving mechanism of relatively simple and low cost of construction.

The specific nature of the invention as well as other objects and advantages thereof, will clearly appear from a description of a preferred embodiment as shown in the accompanying drawings in which:

FIG. 1 is a side elevation of the ball diaphragm and looking in the direction of arrows 1—1 in FIG. 2;

FIG. 2 is a cross section view taken along line 2—2 of FIG. 1;

FIG. 3 is a cross section view taken along line 3—3 of FIG. 2; and

FIG. 4 is a cross section view taken along line 4—4 of FIG. 2.

Referring now to the drawing, reference character 1 indicates generally the ball diaphragm of the invention and consists of a housing, designated generally by 2. Housing 2 consists of a driving plate 3 and a driven plate 4. Each plate is provided with axially disposed shafts 5 and 6 respectively, 5 being the driving shaft and 6 being the driven shaft. The shafts 5 and 6 are integral with the outer faces of plates 3 and 4 as seen in FIG. 2.

Plates 3 and 4 are provided with mounting flanges 7 and 8 respectively and means to secure the plates 3 and 4 are provided and consists of a first retaining ring 9 having a series of smooth bores 10 arranged circumferentially therein. Retaining ring 9 is provided with an annular groove 11 to receive flange 8 of plate 4 therein.

A second retaining ring 12 having an annular groove 13 to receive the flange 7 of plate 3 therein and this ring is also provided with a series of threaded bores 14 arranged circumferentially therein. Bores 10 and 14 receive threaded bolts 15.

Before assembly of the plates 3 and 4, series of balls 16 are placed, one each, in series of recesses 17 and 18 which are arranged circumferentially in the inner faces of plates 3 ad 4 respectfully and a flexible sealing membrane 19 is sandwiched between the retaining rings 9 and 12, balls 16 in recesses 17 and 18 and flanges 7 and 8, as best seen in FIG. 2. The entire assembly 1 is then tightly secured by bolts 15 which may be of sufficient length to secure the housing 2 to a wall of a container as is indicated in broken lines at 20.

In assembly, balls 16 are so arranged that the balls in recesses 17 dovetail between balls 16 in recesses 18, this being due to the fact that balls 16 are partially nested in the recesses 17 and 18 so that they project therefrom and further that the inner faces of both plates 3 and 4 are milled out as at 21 and 22 respectively to provide a space or chamber to accommodate the projecting portion of the balls 16.

Membrane 19 provides a hermetic seal between the plates 3 and 4.

As it will be observed from FIG. 2, the assembled housing 2 is arranged in the manner of a clutch so that when a torque is applied to shaft 5, plate 3 will rotate and so will plate 4 due to the inability of the balls 16 in recesses 17 to override balls 16 in recesses 18 since due to the construction, the recesses 17 are arranged in a circle having the same diameter as the circle in which recesses 18 are arranged. Thus balls 16 in recesses 18 are always in advance of the balls 16 in recesses 17.

On each plate 3 and 4, the separation between balls 16 is such that when the two plates 3 and 4 are assembled facing each other, there is just enough room for a ball 16 on the driving plate 3 to nest between two balls 16 on the driven plate 4 with the resilient membrane 19 lying between them. The opposing balls are indicated by broken lines in FIGS. 3 and 4.

The requisite spacing between plates 3 and 4 is determined by the depth of the grooves 11 and 13 of retaining rings 9 and 12 respectively to provide freedom of movement of plates 3 and 4.

Membrane 19 may be of polyethylene or Teflon or any other suitable material that will provide a long lasting member. The membrane 19 can be quickly replaced by unscrewing bolts 15 and inserting new ones; likewise balls 16.

It is therefore apparent that a simple, yet highly positive drive has been achieved by the ball diaphragm of the invention and the crank is versatile in its uses.

Variations and modifications may be effected without departing from the scope of the novel concept of the present invention as set forth in the appended claims.

What is claimed is:

1. A ball-diaphragm friction drive comprising a housing, said housing comprising a driving plate, a driven plate coaxially opposed with respect to said driving plate; means for transmitting rotation from said driving plate to said driven plate housed in the opposing faces of said driving and driven plates, said means comprising a series of recesses arranged in a circle on each inner face of said driving and driven plates, the circle on each plate being of equal diameter and a series of balls nestled, one each, in said recesses in said plates, said balls protruding from said recesses whereby the balls in said driving plate are dovetailed between the balls in said driven plate, there being milled out portions in the inner faces of said driving and driven plates to provide a space to accommodate the protruding portion of said balls; a sealing membrane disposed between said driving and driven plates, said means for transmitting rotational movement housed in said driving and driven plates; and means for clamping said driving and driven plates, said means for transmitting rotation and said membrane as a unitary structure.

2. A friction drive as set forth in claim 1 wherein the means for clamping the driving and driven plates consist of a first circumferential flange integral with said driving plate, a second circumferential flange integral with said driven plate, a first retaining ring having an annular groove adapted to receive said first flange on said driving plate, there being a series of smooth bores circumferentially arranged along the outer edge of said first retaining ring, a second retaining ring having an annular groove adapted to receive said second flange on said driving plate, there being a series of threaded bores circumferentially arranged along the outer edge of said second retaining ring, and a series of threaded bolts adapted to be received in said smooth and threaded bores in said retaining rings.

References Cited in the file of this patent

UNITED STATES PATENTS

| | | |
|---|---|---|
| 1,417,432 | Walker | May 22, 1922 |
| 2,137,964 | Kelley et al. | Nov. 22, 1938 |
| 2,545,562 | Thiel | Mar. 20, 1951 |
| 2,610,525 | Sprigg | Sept. 16, 1952 |
| 3,004,411 | Bugel | Oct. 17, 1961 |